(12) United States Patent
Hong et al.

(10) Patent No.: US 9,279,049 B2
(45) Date of Patent: *Mar. 8, 2016

(54) LOW-GLOSS THERMOPLASTIC RESIN COMPOSITION HAVING EXCELLENT HEAT RESISTANCE AND WEATHER RESISTANCE

(71) Applicant: Cheil Industries Inc., Gumi-si (KR)

(72) Inventors: Jae Keun Hong, Uiwang-si (KR); Young Sub Jin, Uiwang-si (KR); Byeong Do Lee, Uiwang-si (KR); Ho Ryong Sun, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,019

(22) Filed: Feb. 20, 2015

(65) Prior Publication Data

US 2015/0166781 A1    Jun. 18, 2015

Related U.S. Application Data (63) Continuation of application No. 13/927,601, filed on Jun. 26, 2013, now Pat. No. 9,000,094, which is a continuation-in-part of application No. PCT/KR2011/008986, filed on Nov. 23, 2011.

(30) Foreign Application Priority Data

Dec. 29, 2010   (KR) .................. 10-2010-0138217
Nov. 21, 2011   (KR) .................. 10-2011-0121904

(51) Int. Cl.
| | | |
|---|---|---|
| C08L 33/08 | (2006.01) | |
| C08L 33/20 | (2006.01) | |
| C08L 33/06 | (2006.01) | |
| C08L 23/00 | (2006.01) | |

(52) U.S. Cl.
CPC ............. *C08L 33/08* (2013.01); *C08L 33/066* (2013.01); *C08L 33/20* (2013.01); *C08L 2201/02* (2013.01); *C08L 2205/035* (2013.01); *C08L 2207/04* (2013.01); *C08L 2312/00* (2013.01)

(58) Field of Classification Search
CPC ......... C08L 33/08; C08L 33/20; C08L 33/06; C08L 33/10; C08L 23/00; C08L 2312/00; C08L 2201/02; C08L 2205/035; C08L 2207/04
USPC ........... 525/222, 23, 221, 227, 230, 238, 241, 525/242, 263; 526/65, 329.2, 329.6, 342; 523/122; 524/523
See application file for complete search history.

(56) References Cited

U.S. PATENT DOCUMENTS

| | | |
|---|---|---|
| 3,426,101 A | 2/1969 | Ryan et al. |
| 3,944,631 A | 3/1976 | Yu et al. |
| 4,169,869 A | 10/1979 | Milenius |
| 4,460,742 A | 7/1984 | Kishida et al. |
| 4,652,614 A | 3/1987 | Eichenauer et al. |
| 4,668,737 A | 5/1987 | Eichenauer et al. |
| 5,237,004 A | 8/1993 | Wu et al. |
| 5,475,053 A | 12/1995 | Niessner et al. |
| 5,580,924 A | 12/1996 | Wildi et al. |
| 5,910,553 A | 6/1999 | McKee et al. |
| 6,051,656 A | 4/2000 | Mc Kee et al. |
| 6,111,024 A | 8/2000 | McKee et al. |
| 6,187,862 B1 | 2/2001 | Chang et al. |
| 6,395,828 B1 | 5/2002 | Chang et al. |
| 6,683,123 B1 | 1/2004 | Kozlowski |
| 6,696,165 B1 | 2/2004 | Bennett et al. |
| 6,890,965 B1 | 5/2005 | Johnson et al. |
| 8,222,344 B2 | 7/2012 | Jin et al. |
| 8,507,609 B2 | 8/2013 | Jin et al. |
| 2004/0024122 A1 | 2/2004 | Chang et al. |
| 2007/0287799 A1 | 12/2007 | Ha et al. |
| 2010/0105840 A1 | 4/2010 | Jin et al. |
| 2011/0160397 A1 | 6/2011 | Kwon et al. |

FOREIGN PATENT DOCUMENTS

| | | |
|---|---|---|
| DE | 19614846 | 10/1997 |
| JP | 07-316243 A | 12/1995 |
| JP | 2004-509193 A | 3/2004 |
| KR | 10-2003-0034796 | 5/2003 |
| KR | 10-0440474 A | 5/2003 |
| KR | 2006-0051425 A1 | 12/2007 |
| KR | 10-2008-0036790 A | 4/2008 |
| KR | 1020080036790 A * | 4/2008 |
| KR | 10-2000-0049470 A | 5/2009 |
| KR | 10-2010-0047672 A | 5/2010 |
| WO | 2012/091299 A2 | 7/2012 |

OTHER PUBLICATIONS

International Search Report in counterpart International Application No. PCT/KR2011/008986 dated Jul. 30, 2012, pp. 1-4.
European Search Report in commonly owned European Application No. 09174487, dated Feb. 16, 2010, pp. 1-5.
European Office Action in commonly owned European Application No. 09174487, dated May 11, 2011, pp. 1-4.
Office Action in commonly owned U.S. Appl. No. 12/980,668 mailed Oct. 5, 2012, pp. 1-12.

* cited by examiner

*Primary Examiner* — Michael M Bernshteyn
(74) *Attorney, Agent, or Firm* — Additon, Higgins & Pendleton, P.A.

(57) ABSTRACT

A low-gloss thermoplastic resin composition that can have excellent heat resistance and weather resistance of the present invention includes (A) a thermoplastic resin forming a first dispersed phase; and (B) an acrylic resin forming a second dispersed phase, wherein the first dispersed phase has a network configuration.

26 Claims, 1 Drawing Sheet

(a)  (b)

LOW-GLOSS THERMOPLASTIC RESIN COMPOSITION HAVING EXCELLENT HEAT RESISTANCE AND WEATHER RESISTANCE

CROSS-REFERENCE TO RELATED APPLICATIONS

This application is a continuation application of U.S. application Ser. No. 13/927,601, filed Jun. 26, 2013, pending, which is a continuation-in-part application of International Application No. PCT/KR2011/008986, filed Nov. 23, 2011, claiming priority to Korean Patent Application No. 10-2010-0138217, filed Dec. 29, 2010, and Korean Patent Application No. 10-2011-0121904, filed Nov. 21, 2011. The entire disclosure of each of the foregoing U.S. application Ser. No. 13/927,601, International Application No. PCT/KR2011/008986, Korean Patent Application No. 10-2010-0138217, and Korean Patent Application No. 10-2011-0121904, is incorporated herein by reference.

FIELD OF THE INVENTION

The present invention relates to a low-gloss thermoplastic resin composition that can have excellent heat resistance and weather resistance.

BACKGROUND OF THE INVENTION

Generally, acrylonitrile-butadiene-styrene (ABS) resins can have superior impact resistance and process ability, high mechanical strength and heat distortion temperature, and attractive appearance. Due to these advantages, ABS resins are widely used in various applications, for example, automobiles, electrical/electronic devices, office machines, household electric appliances, toys, and stationery.

However, butadiene rubber components used in ABS resins contain chemically labile double bonds and thus tend to age when exposed to sunlight or UV light. This can limit the use of ABS resins in outdoor products, including electrical/electronic components, materials for agricultural tools, road signs, building finishing materials, door panels, window frames, leisure goods, household articles, sporting goods, and automotive goods.

Many attempts have been made to improve the weather resistance of ABS resins. For example, the addition of weather stabilizers is used. However, this approach offers unsatisfactory results.

Also, considerable research efforts have concentrated on acrylate-styrene-acrylonitrile (ASA) resins using chemically stable acrylic rubbers in place of butadiene rubbers.

Some resin compounds are reinforced with acrylic rubbers to obtain improved impact strength. However, final products using the impact reinforced resin compounds can undergo significant loss of heat resistance due to inherent characteristics of the rubbers. Thus it can be difficult to use these resins in applications where high heat resistance is required. Accordingly, there is research aimed at improving the heat resistance of final products by mixing and kneading such acrylic rubber reinforced resins with resins having relatively good heat resistance.

With the recent steadily growing interest in resins that are free from a feeling of cold plastics and give a sense of warmness, there has been an increasing need for resins that have soft low-gloss surfaces and can be produced without coating. Particularly, stringent regulations for environmental protection have gradually extended the applications of low-gloss resins that can be directly molded while eliminating the need for coating.

Methods for producing low-gloss, weather resistant resins are broadly classified into three groups. The first group of methods is based on the use of inorganic fillers, acrylic resins or cross-linked styrene resins as matt additives or matting agents. The first group of methods is most widely used. The second group of methods is associated with the removal of gloss during post-processing. Such methods include, for example, methods for obtaining low-gloss effects by injection molding using etching molds or coating. The third group of methods is associated with the formation of micro-scale rough surfaces by controlling the size of particles dispersed in matrices. The surfaces scatter incident light, resulting in low gloss.

The first group of methods based on the use of matt additives or matting agents to achieve low-gloss effects is convenient in various aspects but has a limitation in increasing the quality of final products because the uniformity of gloss is determined by the dispersed state of the additives. The specific gravity of the additives is generally high, which may also lead to an increase in the specific gravity of final products.

The second group of methods using injection molding through etching molds or coating may incur considerable production costs due to the introduction of additional processing and may cause pollution, which is disadvantageous from an environmental viewpoint.

According to an approach to achieve low gloss characteristics of common ASA products, small dispersed phases aggregate into a larger volume. However, this approach necessitates an additional process for re-aggregation of particles after polymerization causing dispersion and has basic technical problems, for example, re-dispersion of the aggregated phases during mixing and kneading for the production of products.

U.S. Pat. No. 6,696,165 discloses a method for lowering the gloss of an ASA resin by the addition of about 0.1 to about 20 parts by weight of a crystalline polymer, typified by a polyalkyl terephthalate, and U.S. Pat. No. 6,395,828 discloses a method for lowering the gloss of an ASA resin by the addition of 0.5 to 15 parts by weight of a reaction product of an epoxy compound and an amine compound.

Methods for lowering the gloss of resins by the use of spherical graft copolymers as matting agents are disclosed, for example, in U.S. Pat. Nos. 5,475,053 and 4,652,614. Methods for lowering the gloss of resins by the use of various copolymers as additives are disclosed, for example, in U.S. Pat. Nos. 4,169,869, 4,460,742 and 5,580,924, and Korean Patent Publication No. 2008-0036790.

Other methods are disclosed, for example, in U.S. Pat. Nos. 4,668,737 and 5,237,004. In these methods, core/shell structured rubber particles having a large particle diameter of 0.05 to 20 μm or 2 to 15 μm are used to lower the gloss of resins.

However, the use of such additives may lead to an increase in production cost and may cause problems of peeling, poor physical properties and partially increased gloss. The use of large rubber particles disadvantageously causes a drastic reduction in impact strength despite the advantage of low gloss.

There is thus a need to develop a low-gloss thermoplastic resin that has good resistance to heat and weather without deterioration of other physical properties, such as impact strength and flowability.

SUMMARY OF THE INVENTION

The present invention provides a low-gloss thermoplastic resin composition that can have good resistance to heat and weather while maintaining impact strength and mechanical properties. The low-gloss thermoplastic resin composition can further have superior low gloss characteristics and flowability. The low-gloss thermoplastic resin composition can also have a good balance of physical properties, such as heat resistance, weather resistance, low gloss characteristics and mechanical strength, thus can be particularly suitable for use in outdoor products, road signs, building finishing materials, and automotive parts.

The above and other aspects, object, and features of the present invention will become apparent from the following description.

The low-gloss thermoplastic resin composition that can have good resistance to heat and weather includes (A) a thermoplastic resin forming a first dispersed phase, and (B) an acrylic resin forming a second dispersed phase wherein the first dispersed phase has a network configuration.

In one embodiment, the low-gloss thermoplastic resin composition may further include (C) a heat resistant aromatic vinyl copolymer.

The (A) thermoplastic resin may include (a1) an alkyl (meth)acrylate polymer, and (a2) an aromatic vinyl-vinyl cyanide copolymer wherein the (a1) alkyl (meth)acrylate polymer forms a dispersed phase in a network configuration and the (a2) aromatic vinyl-vinyl cyanide copolymer forms a continuous phase.

The (B) acrylic resin forming a second dispersed phase may be an acrylic graft copolymer resin.

The second dispersed phase may be in the form of particles.

In one embodiment, the low-gloss thermoplastic resin composition may include about 20 to about 50% by weight of the (A) thermoplastic resin having a dispersed phase in a network configuration, about 5 to about 40% by weight of the (B) acrylic resin, and about 10 to about 50% by weight of the (C) heat resistant aromatic vinyl copolymer.

The (A) thermoplastic resin may include about 5 to about 35% by weight of the (a1) alkyl (meth)acrylate polymer and about 65 to about 95% by weight of the (a2) aromatic vinyl-vinyl cyanide copolymer.

The (a1) alkyl (meth)acrylate polymer may include units derived from an alkyl (meth)acrylate compound, an unsaturated carboxylic acid and/or an anhydride thereof, and a compound having two or more hydroxyl groups.

In one embodiment, the (a1) alkyl (meth)acrylate polymer may include: about 60 to about 95% by weight of the alkyl (meth)acrylate compound; about 1 to about 20% by weight of the unsaturated carboxylic acid and/or anhydride thereof; about 0 to about 20% by weight of an aromatic vinyl compound; about 0 to about 10% by weight of a vinyl cyanide compound; and about 0.1 to about 3 equivalents of the compound having two or more hydroxyl groups per equivalent of the unsaturated carboxylic acid and/or anhydride thereof.

In one embodiment, the compound having two or more hydroxyl groups may be selected from the group consisting of $C_2$-$C_{10}$ alkanediols, polyalkylene glycols, polyols, and mixtures thereof.

In one embodiment, the (a1) alkyl (meth)acrylate polymer may include alkyl (meth)acrylate units and unsaturated carboxylic acid and/or anhydride thereof units in the main chain thereof, and the carboxyl groups of the unsaturated carboxylic acid and/or anhydride thereof units may be connected to the hydroxyl groups of the compound having two or more hydroxyl groups by ester bonds to form a dispersed phase in a network configuration.

In a further embodiment, the (a1) alkyl (meth)acrylate polymer may include units derived from an alkyl (meth) acrylate compound, an unsaturated compound having a hydroxyl group, and a compound having two or more carboxyl groups.

In another embodiment, the (a1) alkyl (meth)acrylate polymer may include units derived from an alkyl (meth)acrylate compound, a glycidyl (meth)acrylate compound, and a compound having two or more hydroxyl groups.

The (a2) aromatic vinyl-vinyl cyanide copolymer may include about 60 to about 95% by weight of aromatic vinyl compound units, about 5 to about 40% by weight of vinyl cyanide compound units, and about 0 to about 10% by weight of alkyl (meth)acrylate compound units.

In one embodiment, the (a2) aromatic vinyl-vinyl cyanide copolymer may have a weight average molecular weight of about 150,000 to about 300,000 g/mol.

The (B) acrylic resin may have a structure in which about 40 to about 90% by weight of (b2) an aromatic vinyl compound-vinyl cyanide compound copolymer is grafted onto about 10 to about 60% by weight of (b1) a (meth)acrylic rubber.

The (b2) aromatic vinyl compound-vinyl cyanide compound copolymer may be a copolymer of about 60 to about 80% by weight of an aromatic vinyl compound and about 20 to about 40% by weight of a vinyl cyanide compound.

The (b1) (meth)acrylic rubber particles may have an average particle diameter in the range of about 0.05 to about 1 µm.

The (C) heat resistant aromatic vinyl copolymer may include aromatic vinyl compound units, vinyl cyanide compound units, and cross-linkable monomer units.

In one embodiment, the (C) heat resistant aromatic vinyl copolymer may include: 100 parts by weight of monofunctional vinyl compounds including about 60 to about 80% by weight of an aromatic vinyl compound and about 20 to about 40% by weight of a vinyl cyanide compound; and about 0.01 to about 0.05 parts by weight of a cross-linkable monomer.

In a further embodiment, the resin composition may further include (D) an aromatic vinyl compound-vinyl cyanide compound copolymer, (E) a copolymer including a maleic anhydride compound, or a mixture thereof.

The resin composition may include more than about 0 but not more than about 40% by weight of the (D) aromatic vinyl compound-vinyl cyanide compound copolymer, based on the total weight thereof.

The resin composition may include more than about 0 but not more than about 20% by weight of the (E) copolymer including a maleic anhydride compound, based on the total weight thereof. In one embodiment, the (E) copolymer including a maleic anhydride compound may include about 40 to about 60% by weight of maleic anhydride, N-substituted maleate, or a mixture thereof.

The composition may further include one or more additives selected from the group consisting of antibacterial agents, heat stabilizers, antioxidants, release agents, light stabilizers, inorganic additives, surfactants, coupling agents, plasticizers, admixtures, stabilizers, lubricants, antistatic agents, toning agents, flame-proofing agents, weather stabilizers, colorants, UV absorbers, UV blocking agents, flame retardants, fillers, nucleating agents, adhesion aids, adhesives, and combinations thereof.

In one embodiment, the composition may have a gloss of about 30 G.U. or less as measured using a 75° gloss meter, a Vicat softening temperature of about 100 to about 150° C., a ΔE of about 2.8 or less as measured by UL 746C, and a notched Izod impact strength of about 8 kgf·cm/cm or more as measured at a thickness of ⅛" by ASTM D256.

The present invention also provides a molded article produced from the composition by molding. The molded article can have a morphology of continuous and dispersed phases. The continuous phase includes an aromatic vinyl-vinyl cyanide copolymer and a heat resistant aromatic vinyl copolymer. The dispersed phase consists of a first dispersed phase in a network configuration and a second dispersed phase in the form of particles wherein the first dispersed phase is formed from an alkyl (meth)acrylate polymer and the second dispersed phase is formed from an acrylic resin. The molded article may have a notched Izod impact strength of about 8 kgf·cm/cm or more as measured at a thickness of ⅛" by ASTM D256, and a Vicat softening temperature of about 100 to about 150° C.

The thermoplastic resin composition of the present invention can have good resistance to heat and weather while maintaining impact strength and mechanical properties. In addition, the thermoplastic resin composition of the present invention can have superior low gloss characteristics and flowability, and a good balance of physical properties. Therefore, the thermoplastic resin composition of the present invention can be particularly suitable for use in outdoor products, road signs, building finishing materials, and automotive parts.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, the term "(meth)acrylate" is intended to include both "acrylate" and "methacrylate", unless otherwise specified. Likewise, the term "(meth)acrylic acid" is intended to include both "acrylic acid" and "methacrylic acid".

A low-gloss thermoplastic resin composition that can have good resistance to heat and weather includes (A) a thermoplastic resin forming a first dispersed phase, and (B) an acrylic resin forming a second dispersed phase wherein the first dispersed phase has a network configuration.

In one embodiment, the thermoplastic resin composition of the present invention may further include (C) a heat resistant aromatic vinyl copolymer.

In a further embodiment, the thermoplastic resin composition of the present invention may further include (D) an aromatic vinyl compound-vinyl cyanide compound copolymer, (E) a copolymer including a maleic anhydride compound, or a mixture thereof.

A detailed description will be given concerning the components of the composition according to the present invention.

(A) Thermoplastic Resin Having First Dispersed Phase in Network Configuration

The (A) thermoplastic resin may include (a1) an alkyl (meth)acrylate polymer, and (a2) an aromatic vinyl-vinyl cyanide copolymer. The (a1) alkyl (meth)acrylate polymer forms the first dispersed phase in a network configuration and the (a2) aromatic vinyl-vinyl cyanide copolymer forms a continuous phase.

In one embodiment, the (a1) alkyl (meth)acrylate polymer may include units derived from an alkyl (meth)acrylate compound, an unsaturated carboxylic acid and/or an anhydride thereof, and a compound having two or more hydroxyl groups.

In one embodiment, the (a1) alkyl (meth)acrylate polymer may include alkyl (meth)acrylate units and unsaturated carboxylic acid and/or an anhydride thereof units in the main chain thereof, and the carboxyl groups of the unsaturated carboxylic acid and/or anhydride thereof units may be connected to the hydroxyl groups of the compound having two or more hydroxyl groups by ester bonds to form the first dispersed phase in a network configuration.

In a further embodiment, the (a1) alkyl (meth)acrylate polymer may include units derived from an alkyl (meth)acrylate compound, an unsaturated carboxylic acid and/or anhydride thereof, an aromatic vinyl compound, a vinyl cyanide compound, and a compound having two or more hydroxyl groups. For example, the (a1) alkyl (meth)acrylate polymer may include: about 60 to about 95% by weight of the alkyl (meth)acrylate compound; about 1 to about 20% by weight of the unsaturated carboxylic acid and/or anhydride thereof; about 0 to about 20% by weight of the aromatic vinyl compound; about 0 to about 10% by weight of the vinyl cyanide compound, wherein each of the foregoing is based on the total weight of the (a1) alkyl (meth)acrylate polymer; and about 0.1 to about 3 equivalents of the compound having two or more hydroxyl groups per equivalent of the unsaturated carboxylic acid and/or anhydride thereof.

In some embodiments, the (a1) alkyl (meth)acrylate polymer may include units derived from an alkyl (meth)acrylate compound in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the alkyl (meth)acrylate compound can be in a range from about any of the foregoing amounts to about any other of the foregoing amounts.

In some embodiments, the (a1) alkyl (meth)acrylate polymer may include units derived from an unsaturated carboxylic acid and/or anhydride thereof in an amount of about 1, 2, 3, 4, 5, 6, 7, 8, 9, 10, 11, 12, 13, 14, 15, 16, 17, 18, 19, or 20% by weight. Further, according to some embodiments of the present invention, the amount of the unsaturated carboxylic acid and/or anhydride thereof can be in a range from about any of the foregoing amounts to about any other of the foregoing amounts.

In some embodiments, the (a1) alkyl (meth)acrylate polymer may include units derived from an aromatic vinyl compound thereof in an amount 0 (the aromatic vinyl compound is not present), about 0 (the aromatic vinyl compound is present), 1, 2, 3, 4, 5, 6, 7, 8, 9, 10, 11, 12, 13, 14, 15, 16, 17, 18, 19, or 20% by weight. Further, according to some embodiments of the present invention, the amount of the aromatic vinyl compound can be in a range from about any of the foregoing amounts to about any other of the foregoing amounts.

In some embodiments, the (a1) alkyl (meth)acrylate polymer may include units derived from a vinyl cyanide compound thereof in an amount of 0 (the vinyl cyanide compound is not present), about 0 (the vinyl cyanide compound is present), 1, 2, 3, 4, 5, 6, 7, 8, 9, or 10% by weight. Further, according to some embodiments of the present invention, the amount of the vinyl cyanide compound can be in a range from about any of the foregoing amounts to about any other of the foregoing amounts.

In some embodiments, the (a1) alkyl (meth)acrylate polymer may include the compound having two or more hydroxyl groups in an amount of about 0.1, 0.2, 0.3, 0.4, 0.5, 0.6, 0.7, 0.8, 0.9, 1, 2, or 3 equivalents per equivalent of the unsaturated carboxylic acid and/or anhydride thereof. Further, according to some embodiments of the present invention, the amount of the compound having two or more hydroxyl groups can be in a range from about any of the foregoing amounts to about any other of the foregoing amounts.

Within these ranges, bonding between chains of the (a1) alkyl (meth)acrylate polymer can be sufficient to form a dispersed phase and good heat resistance may be ensured.

In this embodiment, the unsaturated carboxylic acid and/or anhydride thereof is included as a part of repeating units in the chains of the (A) thermoplastic resin, and the compound having two or more hydroxyl groups serves to connect the chains.

In exemplary embodiments, the (a1) alkyl (meth)acrylate polymer may be prepared by polymerization of about 75 to about 95% by weight of the alkyl (meth)acrylate compound, about 1 to about 10% by weight of the unsaturated carboxylic acid and/or anhydride thereof, about 1 to about 10% by weight of the aromatic vinyl compound, about 1 to about 8% by weight of the vinyl cyanide compound, wherein each of the foregoing is based on the total weight of the (a1) alkyl (meth)acrylate polymer, and about 0.1 to about 2.5 equivalents of the compound having two or more hydroxyl groups per equivalent of the unsaturated carboxylic acid or anhydrides thereof. As another example, the (a1) alkyl (meth)acrylate polymer may be prepared by polymerization of about 80 to about 95% by weight of the alkyl (meth)acrylate compound, about 1 to about 5% by weight of the unsaturated carboxylic acid and/or anhydride thereof, about 2 to about 8% by weight of the aromatic vinyl compound, about 1 to about 5% by weight of the vinyl cyanide compound, and about 0.5 to about 2.0 equivalents of the compound having two or more hydroxyl groups per equivalent of the unsaturated carboxylic acid or anhydrides thereof.

The alkyl (meth)acrylate compound may be one having a $C_1$-$C_{10}$ alkyl group. Examples of alkyl (meth)acrylate compounds may include, but are not limited to, methyl methacrylate, ethyl methacrylate, propyl methacrylate, butyl methacrylate, pentyl methacrylate, hexyl methacrylate, heptyl methacrylate, octyl methacrylate, 2-ethyl hexyl methacrylate, methyl acrylate, ethyl acrylate, propyl acrylate, butyl acrylate, pentyl acrylate, hexyl acrylate, heptyl acrylate, octyl acrylate, 2-ethyl hexyl acrylate, and the like. In exemplary embodiments, butyl acrylate may be used. These alkyl (meth) acrylate compounds may be used alone or as a mixture of two or more thereof.

Examples of aromatic vinyl compounds may include, but are not limited to, styrene, α-methylstyrene, p-methylstyrene, and the like. In exemplary embodiments, styrene may be used. These aromatic vinyl compounds may be used alone or as a mixture of two or more thereof.

Examples of vinyl cyanide compounds may include, but are not limited to, acrylonitrile, methacrylonitrile, ethacrylonitrile, and the like. In exemplary embodiments, acrylonitrile may be used. These vinyl cyanide compounds may be used alone or as a mixture of two or more thereof.

Examples of unsaturated carboxylic acids and/or their anhydrides may include, but are not limited to, acrylic acid, methacrylic acid, maleic acid, maleic anhydride, fumaric acid, fumaric anhydride, and the like. In exemplary embodiments, acrylic acid may be used. These unsaturated carboxylic acids and/or their anhydrides may be used alone or as a mixture of two or more thereof.

The compound having two or more hydroxyl groups can have 2 to 10 hydroxyl groups, for example 2 to 5 hydroxyl groups. The compound having two or more hydroxyl groups may be a saturated compound in which all carbon atoms are bonded by single bonds.

Examples of the compound having two or more hydroxyl groups may include without limitation $C_2$-$C_{10}$ alkanediols, polyalkylene glycols, polyols, and the like, which may be used alone or as a mixture of two or more thereof. Examples of the $C_2$-$C_{10}$ alkanediols may include, but are not limited to, ethylene glycol, propylene glycol, 1,4-butanediol, 1,5-pentanediol, 1,6-hexanediol, 1,7-heptanediol, 1,8-octanediol, and the like. Examples of the polyalkylene glycols may include, but are not limited to, polyethylene glycols, polypropylene glycols, and the like. Examples of the polyethylene glycols (PEGs) may include, but are not limited to, PEG300, PEG600, PEG1500, and the like which are distinguished by their molecular weights. Examples of the polyols may include, but are not limited to, xylitol, glycerin, erythritol, sorbitol, acrylic and/or ether-based polyols having a hydroxyl value of about 50 to about 500 and a molecular weight of about 500 to 5000 g/mol, and the like.

In another embodiment, the (a1) alkyl (meth)acrylate polymer may include units derived from an alkyl (meth)acrylate compound, an unsaturated compound having a hydroxyl group, and a compound having two or more carboxyl groups. For example, the (a1) alkyl (meth)acrylate polymer may include: about 60 to about 95% by weight of the alkyl (meth) acrylate compound; about 1 to about 20% by weight of the unsaturated compound having a hydroxyl group; about 0 to about 20% by weight of an aromatic vinyl compound; about 0 to about 10% by weight of a vinyl cyanide compound; wherein each of the foregoing is based on the total weight of the (a1) alkyl (meth)acrylate polymer, and about 0.1 to about 3 equivalents, for example about 0.5 to about 2 equivalents, of the compound having two or more carboxyl groups per equivalent of the unsaturated compound having a hydroxyl group.

In some embodiments, the (a1) alkyl (meth)acrylate polymer may include units derived from an alkyl (meth)acrylate compound in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the alkyl (meth)acrylate compound can be in a range from about any of the foregoing amounts to about any other of the foregoing amounts.

In some embodiments, the (a1) alkyl (meth)acrylate polymer may include units derived from an unsaturated compound having a hydroxyl group in an amount of about 1, 2, 3, 4, 5, 6, 7, 8, 9, 10, 11, 12, 13, 14, 15, 16, 17, 18, 19, or 20% by weight. Further, according to some embodiments of the present invention, the amount of the unsaturated compound having a hydroxyl group can be in a range from about any of the foregoing amounts to about any other of the foregoing amounts.

In some embodiments, the (a1) alkyl (meth)acrylate polymer may include units derived from an aromatic vinyl compound thereof in an amount 0 (the aromatic vinyl compound is not present), about 0 (the aromatic vinyl compound is present), 1, 2, 3, 4, 5, 6, 7, 8, 9, 10, 11, 12, 13, 14, 15, 16, 17, 18, 19, or 20% by weight. Further, according to some embodiments of the present invention, the amount of the aromatic vinyl compound can be in a range from about any of the foregoing amounts to about any other of the foregoing amounts.

In some embodiments, the (a1) alkyl (meth)acrylate polymer may include units derived from a vinyl cyanide compound thereof in an amount of 0 (the vinyl cyanide compound is not present), about 0 (the vinyl cyanide compound is present), 1, 2, 3, 4, 5, 6, 7, 8, 9, or 10% by weight. Further, according to some embodiments of the present invention, the amount of the vinyl cyanide compound can be in a range from about any of the foregoing amounts to about any other of the foregoing amounts.

In some embodiments, the (a1) alkyl (meth)acrylate polymer may include the compound having two or more carboxyl groups in an amount of about 0.1, 0.2, 0.3, 0.4, 0.5, 0.6, 0.7, 0.8, 0.9, 1, 2, or 3 equivalents per equivalent of the unsaturated compound having a hydroxyl group. Further, according to some embodiments of the present invention, the amount of the compound having two or more carboxyl groups can be in a range from about any of the foregoing amounts to about any other of the foregoing amounts.

Within these ranges, bonding between chains of the (a1) alkyl (meth)acrylate polymer can be sufficient to form a dispersed phase and good heat resistance can be ensured.

In this embodiment, the unsaturated compound having a hydroxyl group may be included as a part of repeating units in the chains of the (A) thermoplastic resin, and the compound having two or more carboxyl groups serves to connect the chains.

As the unsaturated compound having a hydroxyl group, there may be used a $C_1$-$C_{10}$ alkyl (meth)acrylate containing a hydroxyl group, for example, but not limited to, hydroxyethyl acrylate, hydroxyethyl methacrylate, and the like, and combinations thereof.

In another embodiment, the (a1) alkyl (meth)acrylate polymer may include units derived from an alkyl (meth)acrylate compound, a glycidyl (meth)acrylate compound, and a compound having two or more hydroxyl groups. For example, the (a1) alkyl (meth)acrylate polymer may include: about 60 to about 95% by weight of the alkyl (meth)acrylate compound; about 1 to about 20% by weight of the glycidyl (meth)acrylate compound; about 0 to about 20% by weight of an aromatic vinyl compound; about 0 to about 10% by weight of a vinyl cyanide compound; wherein each of the foregoing is based on the total weight of the (a1) alkyl (meth)acrylate polymer, and about 0.1 to about 3 equivalents, for example about 0.5 to about 2 equivalents, of the compound having two or more hydroxyl groups per equivalent of the alkyl (meth)acrylate compound.

In some embodiments, the (a1) alkyl (meth)acrylate polymer may include units derived from an alkyl (meth)acrylate compound in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the alkyl (meth)acrylate compound can be in a range from about any of the foregoing amounts to about any other of the foregoing amounts.

In some embodiments, the (a1) alkyl (meth)acrylate polymer may include units derived from a glycidyl (meth)acrylate compound in an amount of about 1, 2, 3, 4, 5, 6, 7, 8, 9, 10, 11, 12, 13, 14, 15, 16, 17, 18, 19, or 20% by weight. Further, according to some embodiments of the present invention, the amount of the glycidyl (meth)acrylate compound can be in a range from about any of the foregoing amounts to about any other of the foregoing amounts.

In some embodiments, the (a1) alkyl (meth)acrylate polymer may include units derived from an aromatic vinyl compound thereof in an amount 0 (the aromatic vinyl compound is not present), about 0 (the aromatic vinyl compound is present), 1, 2, 3, 4, 5, 6, 7, 8, 9, 10, 11, 12, 13, 14, 15, 16, 17, 18, 19, or 20% by weight. Further, according to some embodiments of the present invention, the amount of the aromatic vinyl compound can be in a range from about any of the foregoing amounts to about any other of the foregoing amounts.

In some embodiments, the (a1) alkyl (meth)acrylate polymer may include units derived from a vinyl cyanide compound thereof in an amount of 0 (the vinyl cyanide compound is not present), about 0 (the vinyl cyanide compound is present), 1, 2, 3, 4, 5, 6, 7, 8, 9, or 10% by weight. Further, according to some embodiments of the present invention, the amount of the vinyl cyanide compound can be in a range from about any of the foregoing amounts to about any other of the foregoing amounts.

In some embodiments, the (a1) alkyl (meth)acrylate polymer may include the compound having two or more hydroxyl groups in an amount of about 0.1, 0.2, 0.3, 0.4, 0.5, 0.6, 0.7, 0.8, 0.9, 1, 2, or 3 equivalents per equivalent of the alkyl (meth)acrylate compound. Further, according to some embodiments of the present invention, the amount of the compound having two or more hydroxyl groups can be in a range from about any of the foregoing amounts to about any other of the foregoing amounts.

Within these ranges, bonding between chains of the (a1) alkyl (meth)acrylate polymer can be sufficient to form a dispersed phase and good heat resistance can be ensured.

In another embodiment, the (a1) alkyl (meth)acrylate polymer may include units derived from an alkyl (meth)acrylate compound, a glycidyl (meth)acrylate compound, and a compound having two or more carboxyl groups. As a result of polymerization of the alkyl (meth)acrylate compound with the glycidyl (meth)acrylate compound, the alkyl (meth)acrylate units and the glycidyl (meth)acrylate units are included in the main chain to constitute the chains of the alkyl (meth)acrylate polymer. The epoxy groups of the glycidyl (meth)acrylate units are connected to the carboxyl groups of the compound having two or more carboxyl groups or the hydroxyl groups of the compound having two or more hydroxyl groups by ester bonds. Thus, the chains of the (a1) alkyl (meth)acrylate polymer are connected to each other to form a dispersed phase.

For example, the (a1) alkyl (meth)acrylate polymer may include: about 60 to about 95% by weight of the alkyl (meth) acrylate compound; about 1 to about 20% by weight of the glycidyl (meth)acrylate compound; about 0 to about 20% by weight of an aromatic vinyl compound; about 0 to about 10% by weight of a vinyl cyanide compound; wherein each of the foregoing is based on the total weight of the (a1) alkyl (meth) acrylate polymer, and about 0.1 to about 3 equivalents, for example about 0.5 to about 2 equivalents, of the compound having two or more carboxyl groups per equivalent of the alkyl (meth)acrylate compound.

In some embodiments, the (a1) alkyl (meth)acrylate polymer may include units derived from an alkyl (meth)acrylate compound in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the alkyl (meth)acrylate compound can be in a range from about any of the foregoing amounts to about any other of the foregoing amounts.

In some embodiments, the (a1) alkyl (meth)acrylate polymer may include units derived from a glycidyl (meth)acrylate compound in an amount of about 1, 2, 3, 4, 5, 6, 7, 8, 9, 10, 11, 12, 13, 14, 15, 16, 17, 18, 19, or 20% by weight. Further, according to some embodiments of the present invention, the amount of the glycidyl (meth)acrylate compound can be in a range from about any of the foregoing amounts to about any other of the foregoing amounts.

In some embodiments, the (a1) alkyl (meth)acrylate polymer may include units derived from an aromatic vinyl compound thereof in an amount 0 (the aromatic vinyl compound is not present), about 0 (the aromatic vinyl compound is present), 1, 2, 3, 4, 5, 6, 7, 8, 9, 10, 11, 12, 13, 14, 15, 16, 17, 18, 19, or 20% by weight. Further, according to some embodiments of the present invention, the amount of the aromatic vinyl compound can be in a range from about any of the foregoing amounts to about any other of the foregoing amounts.

In some embodiments, the (a1) alkyl (meth)acrylate polymer may include units derived from a vinyl cyanide compound thereof in an amount of 0 (the vinyl cyanide compound is not present), about 0 (the vinyl cyanide compound is present), 1, 2, 3, 4, 5, 6, 7, 8, 9, or 10% by weight. Further, according to some embodiments of the present invention, the amount of the vinyl cyanide compound can be in a range from about any of the foregoing amounts to about any other of the foregoing amounts.

In some embodiments, the (a1) alkyl (meth)acrylate polymer may include the compound having two or more carboxyl groups in an amount of about 0.1, 0.2, 0.3, 0.4, 0.5, 0.6, 0.7, 0.8, 0.9, 1, 2, or 3 equivalents per equivalent of the alkyl (meth)acrylate compound. Further, according to some embodiments of the present invention, the amount of the compound having two or more carboxyl groups can be in a range from about any of the foregoing amounts to about any other of the foregoing amounts.

Within these ranges, bonding between chains of the (a1) alkyl (meth)acrylate polymer can be sufficient to form a dispersed phase and good heat resistance cam be ensured.

Examples of glycidyl (meth)acrylate compounds may include, but are not limited to, glycidyl acrylate, glycidyl methacrylate, and the like. These glycidyl (meth)acrylate compounds may be used alone or as a mixture thereof. In exemplary embodiments, glycidyl methacrylate can be used.

The compound having two or more carboxyl groups can have 2 to 10 carboxyl groups, for example 2 to 5 carboxyl groups. The compound having two or more carboxyl groups can be a saturated compound in which all carbon atoms are bonded by single bonds. Examples of the compound having two or more carboxyl groups may include without limitation $C_2$-$C_{10}$ alkanedioic acids, polyacids, and the like, which may be used alone or as a mixture thereof.

Examples of the $C_2$-$C_{10}$ alkanedioic acids may include, but are not limited to, butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), and the like, and combinations thereof.

The polyacids can include those having an acid value of about 30 to about 300 and a weight average molecular weight of about 1,000 to about 5,000 g/mol. Specific examples of the polyacids may include, but are not limited to, poly(meth)acrylic acid, styrene-(meth)acrylic acid polymers, styrene-maleic acid polymers, and the like, and combinations thereof. More specific examples of the polyacids may include without limitation: Morez-101 and Morez-100 (Rohm and Haas); Joncryl-678 and Joncryl-690 (BASF); and Soluryl-20 and Soluryl-70 (Hanwha Chemical Co., Ltd.).

The (a2) aromatic vinyl-vinyl cyanide copolymer of the thermoplastic resin composition according to the present invention forms a continuous phase and may be prepared by polymerization of an aromatic vinyl compound, a vinyl cyanide compound, and optionally a $C_1$-$C_{10}$ alkyl (meth)acrylate compound. About 60 to about 95% by weight of the aromatic vinyl compound, about 5 to about 40% by weight of the vinyl cyanide compound, and about 0 to about 10% by weight of the alkyl (meth)acrylate compound, based on the total weight of the foregoing compounds, may be polymerized to prepare the (a2) aromatic vinyl-vinyl cyanide copolymer. For example, about 60 to about 84% by weight of the aromatic vinyl compound, about 15 to about 35% by weight of the vinyl cyanide compound, and about 1 to about 5% by weight of the alkyl (meth)acrylate compound may be used for polymerization.

In some embodiments, the (a2) aromatic vinyl-vinyl cyanide copolymer may include an aromatic vinyl compound in an amount 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the aromatic vinyl compound can be in a range from about any of the foregoing amounts to about any other of the foregoing amounts.

In some embodiments, the (a2) aromatic vinyl-vinyl cyanide copolymer may include a vinyl cyanide compound in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of the vinyl cyanide compound can be in a range from about any of the foregoing amounts to about any other of the foregoing amounts.

In some embodiments, the (a2) aromatic vinyl-vinyl cyanide copolymer may include a $C_1$-$C_{10}$ alkyl (meth)acrylate compound in an amount of 0 (the $C_1$-$C_{10}$ alkyl (meth)acrylate compound is not present), about 0 (the $C_1$-$C_{10}$ alkyl (meth) acrylate compound is present), 1, 2, 3, 4, 5, 6, 7, 8, 9, or 10% by weight. Further, according to some embodiments of the present invention, the amount of the $C_1$-$C_{10}$ alkyl (meth) acrylate compound can be in a range from about any of the foregoing amounts to about any other of the foregoing amounts.

Within these ranges, excellent physical properties, such as impact resistance, yellowness and flow characteristics, can be obtained.

Examples of aromatic vinyl compounds suitable for use in the preparation of the (a2) aromatic vinyl-vinyl cyanide copolymer may include, but are not limited to, styrene, α-methylstyrene, p-methylstyrene, and the like. In exemplary embodiments, styrene can be used. These aromatic vinyl compounds may be used alone or as a mixture of two or more thereof.

Examples of vinyl cyanide compounds suitable for use in the preparation of the (a2) aromatic vinyl-vinyl cyanide copolymer may include, but are not limited to, acrylonitrile, methacrylonitrile, ethacrylonitrile, and the like. In exemplary embodiments, acrylonitrile can be used. These vinyl cyanide compounds may be used alone or as a mixture of two or more thereof.

Examples of $C_1$-$C_{10}$ alkyl (meth)acrylate compounds suitable for use in the preparation of the (a2) aromatic vinyl-vinyl cyanide copolymer may include, but are not limited to, methyl methacrylate, ethyl methacrylate, propyl methacrylate, butyl methacrylate, pentyl methacrylate, hexyl methacrylate, heptyl methacrylate, octyl methacrylate, 2-ethyl hexyl methacrylate, methyl acrylate, ethyl acrylate, propyl acrylate, butyl acrylate, pentyl acrylate, hexyl acrylate, heptyl acrylate, octyl acrylate, 2-ethyl hexyl acrylate, and the like. In exemplary embodiments, butyl acrylate can be used. These alkyl (meth)acrylate compounds may be used alone or as a mixture of two or more thereof.

The (a2) aromatic vinyl-vinyl cyanide copolymer can have a weight average molecular weight of about 150,000 to about 300,000 g/mol, for example about 180,000 to about 250,000 g/mol. Within this range, the size of the dispersed phase can be appropriately maintained, which can ensure high impact strength and excellent low gloss characteristics, and peeling can be prevented.

The (A) thermoplastic resin forming a first dispersed phase in a network configuration may be prepared by continuous bulk polymerization. The dispersed phase is not easy to form by general polymerization methods, such as emulsion polymerization and suspension polymerization, for preparing rubbery phases. Since the aromatic vinyl-vinyl cyanide copolymer forming a continuous phase should be separately prepared and processed into a final product, for example, by melt extrusion, polymerization methods other than continuous bulk polymerization are not suitable to efficiently prepare the low-gloss, weather resistant thermoplastic resin composition of the present invention.

For example, about 60 to about 95% by weight of the alkyl (meth)acrylate, about 1 to about 20% by weight of the unsaturated carboxylic acid or anhydrides thereof, about 0 to about 20% by weight of the aromatic vinyl compound, and about 0 to about 10% by weight of the vinyl cyanide compound, based on the total weight of the foregoing compounds, can be mixed to prepare a first monomer mixture. The first monomer mixture can be continuously fed into a first reactor of a reactor system including a plurality of reactors connected in series. The first monomer mixture can be allowed to polymerize until the polymerization conversion reaches about 85 to about 95%. The polymerization product prepared in the first reactor can be continuously fed into a second reactor, and at the same time, a second monomer mixture including about 60 to about 95% by weight of the aromatic vinyl compound, about 5 to about 40% by weight of the vinyl cyanide compound, and about 0 to about 10% by weight of the alkyl (meth)acrylate, together with the compound having two or more hydroxyl groups, can be continuously fed into the second reactor. At this time, the compound having two or more hydroxyl groups can be used in an amount of about 0.1 to about 3 equivalents per equivalent of the unsaturated carboxylic acid and/or anhydride thereof. The polymerization product, the second monomer mixture, and the compound having two or more hydroxyl groups can be allowed to polymerize in the second reactor.

A solvent, an initiator, and a molecular weight modifier can be added in amounts of about 0 to about 20 parts by weight, for example about 0.01 to about 0.05 parts by weight, and as another example about 0 to about 0.5 parts by weight, respectively, based on about 100 parts by weight of the second monomer mixture.

The reactor system can include 2 to 5 reactors. The polymerization reactions may be continuously carried out through the reactors. The final polymerization conversion to the thermoplastic resin can be controlled to about 50 to about 70%, for example about 50 to about 65%, in the final reactor where the polymerization is finished.

In a further embodiment, after the final polymerization product including a dispersed phase in a network configuration and a continuous phase can be prepared through the continuous polymerization processes in the reactors, unreacted reactants may be separated from the final polymerization product using a devolatilization vessel under vacuum at high temperature. The thermoplastic resin may be produced into pellets using a pelletizer.

A detailed description of a method for preparing the (A) thermoplastic resin having a dispersed phase in a network configuration can be found in Korean Patent Publication No. 2010-47672, the entire disclosure of which is incorporated herein by reference.

The (A) thermoplastic resin having a dispersed phase in a network configuration may include about 5 to about 35% by weight of the (a1) alkyl (meth)acrylate polymer and about 65 to about 95% by weight of the (a2) aromatic vinyl-vinyl cyanide copolymer, based on the total weight of the (A) thermoplastic resin. For example, the (A) thermoplastic resin may include about 5 to about 25% by weight of the (a1) alkyl (meth)acrylate polymer and about 75 to about 95% by weight of the (a2) aromatic vinyl-vinyl cyanide copolymer.

In some embodiments, the (A) thermoplastic resin having a dispersed phase in a network configuration may include the (a1) alkyl (meth)acrylate polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35% by weight. Further, according to some embodiments of the present invention, the amount of the (a1) alkyl (meth)acrylate polymer can be in a range from about any of the foregoing amounts to about any other of the foregoing amounts.

In some embodiments, the (A) thermoplastic resin having a dispersed phase in a network configuration may include the (a2) aromatic vinyl-vinyl cyanide copolymer in an amount of about 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of the (a2) aromatic vinyl-vinyl cyanide copolymer can be in a range from about any of the foregoing amounts to about any other of the foregoing amounts.

When the (A) thermoplastic resin having a dispersed phase in a network configuration includes the (a1) alkyl (meth) acrylate polymer and the (a2) aromatic vinyl-vinyl cyanide copolymer in amounts within these ranges, a balance of low gloss characteristics and impact strength can be obtained.

The composition may include the (A) thermoplastic resin having a dispersed phase in a network configuration in an amount of about 20 to about 50% by weight, for example about 25 to about 45% by weight, based on the total weight of the composition. In some embodiments, the composition may include the (A) thermoplastic resin having a dispersed phase in a network configuration in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the (A) thermoplastic resin having a dispersed phase in a network configuration can be in a range from about any of the foregoing amounts to about any other of the foregoing amounts.

When the composition includes the (A) thermoplastic resin having a dispersed phase in a network configuration in an amount within this range, desired low gloss characteristics can be achieved while preventing deterioration of impact resistance.

(B) Acrylic Resin

The (B) acrylic resin forms a second dispersed phase. The (B) acrylic resin may be prepared by graft polymerization of a monomer mixture including an aromatic vinyl compound and a vinyl cyanide compound onto a (meth)acrylic rubber. In exemplary embodiments, the (B) acrylic resin is a copolymer in which about 40 to about 90% by weight of an aromatic vinyl compound-vinyl cyanide compound copolymer is grafted onto about 10 to about 60% by weight of a (meth) acrylic rubber.

In some embodiments, the (B) acrylic resin copolymer can include an aromatic vinyl compound-vinyl cyanide compound copolymer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the aromatic vinyl compound-vinyl cyanide compound copolymer can be in a range from about any of the foregoing amounts to about any other of the foregoing amounts.

In some embodiments, the (B) acrylic resin copolymer can include a (meth)acrylic rubber in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the amount of the (meth)acrylic rubber can be in a range from about any of the foregoing amounts to about any other of the foregoing amounts.

The acrylic graft copolymer resin can be prepared by suitable polymerization methods known in the art, for example, emulsion polymerization and/or suspension polymerization. In exemplary embodiments, emulsion graft polymerization can be used.

As the acrylic rubber for the preparation of the acrylic graft copolymer (B), a polymer of a $C_2$-$C_8$ alkyl (meth)acrylate may be used. Specific examples of $C_2$-$C_8$ alkyl (meth)acrylates suitable for use in the preparation of the acrylic graft copolymer (B) may include without limitation methyl acrylate, ethyl acrylate, propyl acrylate, butyl acrylate, 2-ethyl hexyl acrylate, methyl methacrylate, ethyl methacrylate, propyl methacrylate, butyl methacrylate, and the like. These alkyl (meth)acrylates may be used alone or as a mixture of two or more thereof. In exemplary embodiments, butyl acrylate can be used.

The acrylic rubber particles may have an average particle diameter of about 0.05 to about 1 μm, for example about 0.07 to about 0.7 μm, and as another example about 0.1 to about 0.5 μm. Within this range, high impact strength can be achieved.

The aromatic vinyl compound-vinyl cyanide compound copolymer grafted onto the acrylic rubber may be a copolymer of about 60 to about 80% by weight of the aromatic vinyl compound and about 20 to about 40% by weight of the vinyl cyanide compound, based on the total weight of the copolymer.

In some embodiments, the aromatic vinyl compound-vinyl cyanide compound copolymer can include an aromatic vinyl compound in an amount of about 60, 61, 62, 63, 64, 65, 66, 67, 68, 69, 70, 71, 72, 73, 74, 75, 76, 77, 78, 79, or 80% by weight. Further, according to some embodiments of the present invention, the amount of the aromatic vinyl compound can be in a range from about any of the foregoing amounts to about any other of the foregoing amounts.

In some embodiments, the aromatic vinyl compound-vinyl cyanide compound copolymer can include a vinyl cyanide compound in an amount of about 20, 21, 22, 23, 24, 25, 26, 27, 28, 29, 30, 31, 32, 33, 34, 35, 36, 37, 38, 39, or 40% by weight. Further, according to some embodiments of the present invention, the amount of the vinyl cyanide compound can be in a range from about any of the foregoing amounts to about any other of the foregoing amounts.

Examples of aromatic vinyl compounds may include without limitation styrene, α-methylstyrene, p-methylstyrene, 2,4-dimethylstyrene, vinyl toluene, and the like. These aromatic vinyl compounds may be used alone or as a mixture of two or more thereof.

Examples of vinyl cyanide compounds suitable for use in the present invention may include without limitation acrylonitrile, methacrylonitrile, ethacrylonitrile, and the like. These vinyl cyanide compounds may be used alone or as a mixture of two or more thereof.

The composition can include the acrylic graft copolymer (B) in an amount of about 5 to about 40% by weight, for example about 15 to about 30% by weight, based on the total weight of the composition. In some embodiments, the composition can include the acrylic graft copolymer (B) in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of acrylic graft copolymer (B) can be in a range from about any of the foregoing amounts to about any other of the foregoing amounts.

When the composition includes the acrylic graft copolymer (B) in an amount within this range, the composition can have a good balance of impact resistance, low gloss characteristics and flowability.

(C) Heat Resistant Aromatic Vinyl Copolymer

The (C) heat resistant aromatic vinyl copolymer may include aromatic vinyl compound units, vinyl cyanide compound units, and cross-linkable monomer units.

In one embodiment, the (C) heat resistant aromatic vinyl copolymer may include: about 100 parts by weight of monofunctional vinyl compounds including about 60 to about 80% by weight of an aromatic vinyl compound and about 20 to about 40% by weight of a vinyl cyanide compound; and about 0.01 to about 0.2 parts by weight of a cross-linkable monomer. For example, the (C) heat resistant aromatic vinyl copolymer may include: about 100 parts by weight of monofunctional vinyl compounds including about 65 to about 75% by weight of an aromatic vinyl compound and about 25 to about 35% by weight of a vinyl cyanide compound; and about 0.01 to about 0.05 parts by weight of a cross-linkable monomer.

In some embodiments, the monofunctional vinyl compounds may include an aromatic vinyl compound in an amount of about 60, 61, 62, 63, 64, 65, 66, 67, 68, 69, 70, 71, 72, 73, 74, 75, 76, 77, 78, 79, or 80% by weight. Further, according to some embodiments of the present invention, the amount of the aromatic vinyl compound can be in a range from about any of the foregoing amounts to about any other of the foregoing amounts.

In some embodiments, the monofunctional vinyl compounds may include an vinyl cyanide compound in an amount of about 20, 21, 22, 23, 24, 25, 26, 27, 28, 29, 30, 31, 32, 33, 34, 35, 36, 37, 38, 39, or 40% by weight. Further, according to some embodiments of the present invention, the amount of the vinyl cyanide compound can be in a range from about any of the foregoing amounts to about any other of the foregoing amounts.

In some embodiments, the (C) heat resistant aromatic vinyl copolymer may include a cross-linkable monomer in an amount of about 0.01, 0.02, 0.03, 0.04, or 0.05 parts by weight. Further, according to some embodiments of the present invention, the amount of the cross-linkable monomer can be in a range from about any of the foregoing amounts to about any other of the foregoing amounts.

Examples of the aromatic vinyl compound may include without limitation styrene, α-methylstyrene, and the like, and mixtures thereof.

Examples of the vinyl cyanide compound may include without limitation, acrylonitrile, methacrylonitrile, and the like, and mixtures thereof.

The cross-linkable monomer is a monomer including two or more unsaturated groups. Examples of cross-linkable monomers suitable for use in the present invention may include, but are not limited to, divinylbenzene, ethylene glycol dimethacrylate, allyl methacrylate, allyl acrylate, triallyl cyanurate, triallyl isocyanurate, diallyl phthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylolpropane trimethacrylate, trimethylolpropane triacrylate, tetramethylolmethane tetramethacrylate, tetramethylolmethane tetraacrylate, dipropylene glycol dimethacrylate, dipropylene glycol diacrylate, 3-butanediol diacrylate, 1,3-butanediol dimethacrylate, 1,4-butanediol diacrylate, 1,4-butanediol dimethacrylate, tetraethylene glycol diacrylate, tetraethylene glycol dimethacrylate, and the like. These cross-linkable monomers may be used alone or as a mixture of two or more thereof.

In the present invention, the cross-linkable monomer may be included in an amount of about 0.01 to about 0.2 parts by weight, based on about 100 parts by weight of the monofunctional vinyl compounds. In some embodiments, the cross-linkable monomer may be included in an amount of about 0.01, 0.02, 0.03, 0.04, 0.05, 0.06, 0.07, 0.08, 0.09, 0.1, or 0.2 parts by weight. Further, according to some embodiments of the present invention, the amount of the cross-linkable monomer can be in a range from about any of the foregoing amounts to about any other of the foregoing amounts.

When the amount of the cross-linkable monomer is within the range defined above, the molecular weight of the (C) heat resistant aromatic vinyl copolymer can be easily controlled and the impact resistance of a final product can be advantageously improved.

If necessary, the (C) heat resistant aromatic vinyl copolymer may further include at least one monomer selected from acrylic acid, methacrylic acid, maleic anhydride, N-substituted maleimide, and the like, and combinations thereof to impart processability and heat resistance.

The (C) heat resistant aromatic vinyl copolymer can be prepared by general polymerization methods, for example, bulk polymerization, solution polymerization, emulsion polymerization and suspension polymerization. In exemplary embodiments, continuous bulk polymerization can be used.

In one embodiment of the present invention, the (C) heat resistant aromatic vinyl copolymer can be prepared by continuously feeding a mixture of raw materials including the aromatic vinyl compound, such as α-methylstyrene, the vinyl cyanide compound, and the polyfunctional vinyl compound into a reactor system including a plurality of reactors connected in series, and sequentially polymerizing the raw materials in the reactors. At this time, the conversion in each of the reactors can be controlled to about 10 to about 25%. The reactor system can include 3 to 5 reactors. A method for preparing the (C) heat resistant aromatic vinyl copolymer is disclosed in Korean Patent Publication No. 2007-115737, the entire disclosure of which is incorporated herein by reference in its entirety.

The (C) heat resistant aromatic vinyl copolymer used in the present invention may have a weight average molecular weight of about 80,000 to about 120,000 g/mol. Within this range, good heat resistance, together with good impact resistance and high flowability, can be imparted.

The composition may include the (C) heat resistant aromatic vinyl copolymer in an amount of about 10 to about 50% by weight, for example about 15 to about 30% by weight, based on the total weight of the composition. In some embodiments, the composition may include the (C) heat resistant aromatic vinyl copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the (C) heat resistant aromatic vinyl copolymer can be in a range from about any of the foregoing amounts to about any other of the foregoing amounts.

When the composition includes the (C) heat resistant aromatic vinyl copolymer in an amount within this range, a good balance of impact resistance, flowability and heat resistance can be obtained.

(D) Aromatic Vinyl Compound-Vinyl Cyanide Compound Copolymer

The (D) aromatic vinyl compound-vinyl cyanide compound copolymer may be prepared by mixing about 10 to about 60 parts by weight of a vinyl cyanide compound with about 40 to about 90 parts by weight of an aromatic vinyl compound, and polymerizing the mixture by a general method. Suitable polymerization methods may include, for example, bulk polymerization, solution polymerization, emulsion polymerization, and suspension polymerization.

In some embodiments, the (D) aromatic vinyl compound-vinyl cyanide compound copolymer can include a vinyl cyanide compound in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the amount of the vinyl cyanide compound can be in a range from about any of the foregoing amounts to about any other of the foregoing amounts.

In some embodiments, the (D) aromatic vinyl compound-vinyl cyanide compound copolymer can include an aromatic vinyl compound in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the aromatic vinyl compound can be in a range from about any of the foregoing amounts to about any other of the foregoing amounts.

Examples of aromatic vinyl compounds suitable for use in the preparation of the aromatic vinyl copolymer resin (D) may include, but are not limited to, styrene, α-methylstyrene, para-methylstyrene, and the like. These aromatic vinyl compounds may be used alone or as a mixture of two or more thereof. In exemplary embodiments, styrene can be used.

Examples of vinyl cyanide compounds suitable for use in the preparation of the aromatic vinyl copolymer resin (D) may include, but are not limited to, acrylonitrile, methacrylonitrile, ethacrylonitrile, and the like. These vinyl cyanide compounds may be used alone or as a mixture of two or more thereof. In exemplary embodiments, acrylonitrile can be used.

The (D) aromatic vinyl compound-vinyl cyanide compound copolymer may have a weight average molecular weight of about 80,000 to about 300,000 g/mol. Within this range, a good balance of flowability and impact resistance can be imparted.

The composition may include the (D) aromatic vinyl compound-vinyl cyanide compound copolymer in an amount of about 40% by weight or less, based on the total weight of the composition. In one embodiment, the content of the (D) aromatic vinyl compound-vinyl cyanide compound copolymer is more than 0 but not more than 40% by weight, for example from about 10 to about 35% by weight. In some embodiments, the composition may include the (D) aromatic vinyl compound-vinyl cyanide compound copolymer in an amount of 0 (the (D) aromatic vinyl compound-vinyl cyanide compound copolymer is not present, about 0 (the (D) aromatic vinyl compound-vinyl cyanide compound copolymer is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of the (D) aromatic vinyl compound-vinyl cyanide compound copolymer can be in a range from about any of the foregoing amounts to about any other of the foregoing amounts.

When the composition includes the (D) aromatic vinyl compound-vinyl cyanide compound copolymer in an amount within this range, a good balance of flowability and impact resistance can be obtained.

(E) Copolymer Including Maleic Anhydride Compound

The (E) copolymer including a maleic anhydride compound may be prepared by mixing maleic anhydride, N-substituted maleate or a mixture thereof with an aromatic vinyl compound, and polymerizing the mixture by a general method. Suitable polymerization methods may include, for example, bulk polymerization, solution polymerization, emulsion polymerization, and suspension polymerization.

In one embodiment, the (E) copolymer including a maleic anhydride compound is a copolymer of about 40 to about 60% by weight of maleic anhydride, N-substituted maleate or a mixture thereof, and about 40 to about 60% by weight of an aromatic vinyl compound, based on the total weight of the (E) copolymer.

In some embodiments, the (E) copolymer including a maleic anhydride compound may include maleic anhydride, N-substituted maleate or a mixture thereof in an amount of about 40, 41, 42, 43, 44, 45, 46, 47, 48, 49, 50, 51, 52, 53, 54, 55, 56, 57, 58, 59, or 60% by weight. Further, according to some embodiments of the present invention, the amount of the maleic anhydride, N-substituted maleate or a mixture thereof can be in a range from about any of the foregoing amounts to about any other of the foregoing amounts.

In some embodiments, the (E) copolymer including a maleic anhydride compound may include an aromatic vinyl compound in an amount of about 40, 41, 42, 43, 44, 45, 46, 47, 48, 49, 50, 51, 52, 53, 54, 55, 56, 57, 58, 59, or 60% by weight. Further, according to some embodiments of the present invention, the amount of the aromatic vinyl compound can be in a range from about any of the foregoing amounts to about any other of the foregoing amounts.

Within these ranges, a good balance of heat resistance and flowability can be imparted.

Examples of aromatic vinyl compounds suitable for use in the preparation of the (E) copolymer including a maleic anhydride compound may include, but are not limited to, styrene, α-methylstyrene, para-methylstyrene, and the like. These aromatic vinyl compounds may be used alone or as a mixture of two or more thereof. In exemplary embodiments, styrene can be used.

The composition may include the (E) copolymer including a maleic anhydride compound may be included in an amount of 20% by weight or less, based on the total weight of the composition. In one embodiment, the content of the (E) copolymer including a maleic anhydride compound is more than 0 but not more than 20% by weight, for example from about 3 to about 15% by weight. In some embodiments, the composition may include the (E) copolymer including a maleic anhydride compound in an amount of 0 (the (E) copolymer including a maleic anhydride compound is not present), about 0 (the (E) copolymer including a maleic anhydride compound is present), 1, 2, 3, 4, 5, 6, 7, 8, 9, 10, 11, 12, 13, 14, 15, 16, 17, 18, 19, or 20% by weight. Further, according to some embodiments of the present invention, the amount of the (E) copolymer including a maleic anhydride compound can be in a range from about any of the foregoing amounts to about any other of the foregoing amounts.

When the composition includes the (E) copolymer including a maleic anhydride compound in an amount within this range, a good balance of flowability, impact resistance and heat resistance can be obtained.

The resin composition of the present invention may further include one or more additives known in the art, in addition to the above components. Examples of such additives may include without limitation antibacterial agents, heat stabilizers, antioxidants, release agents, light stabilizers, inorganic additives, surfactants, coupling agents, plasticizers, admixtures, stabilizers, lubricants, antistatic agents, toning agents, flame-proofing agents, weather stabilizers, colorants, UV absorbers, UV blocking agents, flame retardants, fillers, nucleating agents, adhesion aids, and adhesives. These additives may be used alone or as a mixture of two or more thereof.

The thermoplastic resin composition of the present invention can have very outstanding low gloss characteristics compared to conventional weather resistant thermoplastic resin compositions. For example, the thermoplastic resin composition of the present invention can have a gloss of about 30 G.U. or less, for example about 21 G.U. or less, as measured using a 75° glass meter.

The resin composition of the present invention can have a Vicat softening temperature of about 100 to about 150° C., and a ΔE of about 2.8 or less, for example about 0.1 to about 2.5, as measured by UL 746C.

The resin composition of the present invention can have a notched Izod impact strength of about 8 kgf·cm/cm or more, for example about 10 to about 50 kgf·cm/cm, as measured at a thickness of ⅛" by ASTM D256.

The thermoplastic resin composition of the present invention can have a good balance of physical properties, such as impact strength, mechanical strength and flowability, while maintaining excellent weather resistance, heat resistance and low gloss characteristics. Due to these advantages, the thermoplastic resin can be widely used in electrical/electronic components, materials for agricultural tools, road signs, building finishing materials, door panels, window frames, leisure goods, household articles, sporting goods, and automotive goods.

The above products can be manufactured by molding the thermoplastic resin composition of the present invention. Examples of molding processes suitable for the manufacture of the products may include, but are not limited to, extrusion, injection molding, and casting, which can be readily practiced by those skilled in the art to which the invention pertains.

In another aspect of the present invention, a molded article is produced by molding the resin composition. The molded article may have a first dispersed phase in a network configuration and a dispersed phase in the form of particles in a continuous phase. The first dispersed phase is formed from the (a1) alkyl (meth)acrylate polymer, the dispersed phase is formed from the (B) acrylic resin, and the continuous phase includes the (a2) aromatic vinyl-vinyl cyanide copolymer and the (C) heat resistant aromatic vinyl copolymer.

The continuous phase may further include the (D) aromatic vinyl compound-vinyl cyanide compound copolymer, the (E) copolymer including a maleic anhydride compound, or a mixture thereof.

Next, the present invention will be better appreciated from the following examples and comparative examples. It should be understood that these examples are provided for illustration only and are not to be construed in any way as limiting the scope of the present invention. Descriptions of details apparent to those skilled in the art will be omitted.

The specifications of components used in the following examples and comparative examples 1 are as follows.

(A) Thermoplastic Resin Having Dispersed Phase in Network Configuration 100 parts by weight of toluene, 0.2 parts by weight of benzoyl peroxide (BPO) and 0.05 parts by weight of t-dodecyl mercaptan (TDM) are mixed with 100 parts by weight of a first monomer mixture consisting of 90 parts by weight of butyl acrylate (BA), 5 parts by weight of styrene (SM), 2 parts by weight of acrylonitrile (AN) and 3 parts by weight of acrylic acid (AA) to prepare a first reactant. The first reactant is fed at a rate of 1 kg/hr into a first reactor (R-1) of a continuous polymerization reactor system consisting of three reactors connected in series, which are jacketed for easy reaction temperature control. The first reactant is allowed to polymerize at 80° C. for a retention time of 8 hr in the first reactor to prepare a polymerization product. The polymerization conversion is 90%. The polymerization product prepared in the first reactor (R-1) is continuously fed into a second reactor (R-2) of the continuous polymerization reactor system.

10 parts by weight of toluene, 0.02 parts by weight of 1,1-bis(t-butylperoxy)cyclohexane (PHX-C), 0.1 parts by weight of t-dodecyl mercaptan (TDM) and 1.47 parts by weight (corresponding to an equivalent ratio of 1.0) of polyethylene glycol (PEG600) having a molecular weight of 600 are mixed with 100 parts by weight of a second monomer mixture consisting of 72 parts by weight of styrene (SM), 25 parts by weight of acrylonitrile (AN) and 3 parts by weight of butyl acrylate (BA) to prepare a second reactant. The second reactant is fed at a rate of 8.5 kg/hr into the second reactor (R-2) of the continuous polymerization reactor system. The second reactant is allowed to polymerize at 110° C. for a retention time of 2 hr in the second reactor to prepare a polymerization product. The polymerization conversion is 25%.

The polymerization product prepared in the second reactor (R-2) is continuously fed into a third reactor (R-3) of the continuous polymerization reactor system and is allowed to polymerize at 130° C. for a retention time of 2 hr. The polymerization convention is 55%.

Figure 1:
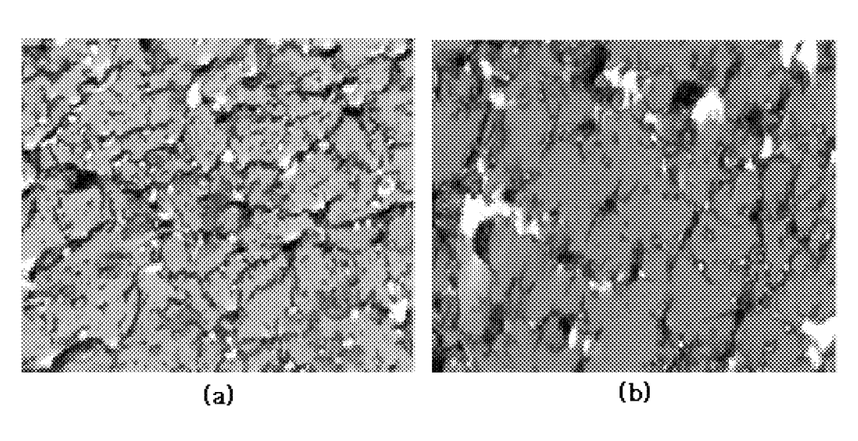
FIG. 1 shows TEM images of (A) a thermoplastic resin having a dispersed phase in a network configuration (magnification 7,000× (a), magnification 12,000× (b)), which was used in the Examples Section.

The resulting polymerization product in the third reactor (R-3) is continuously fed into a devolatilization vessel whose temperature and pressure are maintained at 240° C. and 20 Torr, respectively. In the devolatilization vessel, unreacted monomers and the solvent are removed, giving a thermoplastic resin (A). The (A) thermoplastic resin is pelletized using a pelletizer. TEM images of the (A) thermoplastic resin are taken at different magnifications of 7,000× and 12,000×. The results are shown in FIG. 1. The images reveal the formation of a dispersed phase in a network configuration.

(B) Acrylic Resin

An ASA resin (CHAS, Cheil Industries Inc.) is used.

(C) Heat Resistant Aromatic Vinyl Copolymer

TJ-5380 (Cheil Industries Inc.) is used. The copolymer contains 100 parts by weight of a monomer mixture including 70 wt % of α-methylstyrene and 30 wt % of acrylonitrile, and 0.05 parts by weight of divinylbenzene.

(D) Aromatic Vinyl Compound-Vinyl Cyanide Compound Copolymer

A SAN resin (AP-30, Cheil Industries Inc.) having a weight average molecular weight of 130,000 g/mol is used. The SAN resin includes 71.5 wt % of styrene and 28.5 wt % of acrylonitrile.

(E) Copolymer Including Maleic Anhydride Compound

A styrene-N-phenylmaleimide copolymer (DENKA IP, DENKA) is used.

EXAMPLES 1-7 and COMPARATIVE EXAMPLES 1-2

The components are mixed in the amounts shown in Table 1. To each of the mixtures is added 0.5 parts by weight of octadecyl 3-(4-hydroxy-3,5-di-tert-butylphenyl)propionate as a hindered phenolic antioxidant. The resulting mixture is extruded using a twin-screw extruder (L/B=29, diameter=45 mm) to produce pellets. After drying at 80° C. for 3 hr, the pellets are injected using a 6 Oz injection molding machine to produce specimens. The injection molding is performed at a molding temperature of 180-280° C. and a die temperature of 40-80° C. The physical properties of the specimens are measured by the following methods. The results are shown in Table 1.

TABLE 1

|  | Example | | | | | | | Comparative Example | |
| --- | --- | --- | --- | --- | --- | --- | --- | --- | --- |
|  | 1 | 2 | 3 | 4 | 5 | 6 | 7 | 1 | 2 |
| (A) | 40 | 40 | 40 | 40 | 40 | 30 | 30 | — | 60 |
| (B) | 25 | 15 | 15 | 25 | 25 | 15 | 25 | 55 | — |
| (C) | 35 | 20 | 15 | 20 | 15 | 20 | 15 | 15 | 15 |
| (D) | — | 20 | 20 | 10 | 10 | 30 | 20 | 20 | 20 |
| (E) | — | 5 | 10 | 5 | 10 | 5 | 10 | 10 | 5 |
| MI | 6.3 | 6.6 | 5.2 | 5.1 | 4.6 | 10.3 | 9.6 | 1.8 | 10.2 |
| Izod | 13.6 | 9.3 | 8.1 | 12.8 | 11.5 | 8.9 | 10.6 | 13.7 | 5.5 |
| VST | 103.6 | 102.1 | 104.6 | 100.1 | 101.4 | 101.2 | 103.9 | 105.1 | 99.1 |
| Gloss | 33.4 | 19.1 | 15.2 | 35.6 | 33.0 | 24.3 | 39.6 | 90.5 | 14.3 |
| ΔE | 2.5 | 2.3 | 2.4 | 2.6 | 2.5 | 2.4 | 2.7 | 3.1 | 2.1 |

<Methods for Evaluation of Physical Properties>

1. Melt flow index (MI, g/10 min) is measured under the conditions of 220° C./10 kg by ASTM D-1238.
2. Izod impact strength (kgf·cm/cm) is measured under 1/8" notched conditions by ASTM D256.
3. Vicat softening temperature (° C.) is measured under the conditions of 5 kg and 50° C./HR by ISO R 306.
4. 75° gloss (G.U.) is measured using a BYK-Gardner gloss meter.
5. ΔE value is measured by UL 746C to evaluate weather resistance.

As can be seen from the results in Table 1, the thermoplastic resin compositions prepared in Examples 1-7 exhibit excellent low gloss characteristics, heat resistance and weather stability while maintaining impact strength and other physical properties. In contrast, the thermoplastic resin composition of Comparative Example 1, which did not use the thermoplastic resin having a first dispersed phase in a network configuration, fails to achieve desired low gloss characteristics and exhibits extremely poor flow characteristics and weather resistance. The thermoplastic resin composition of Comparative Example 2, which did not use the (B) acrylic resin, fails to achieve desired high impact strength.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. A low-gloss thermoplastic resin composition with resistance to heat and weather, comprising:
   (A) a thermoplastic resin forming a first dispersed phase, and
   (B) an acrylic resin forming a second dispersed phase, wherein the first dispersed phase has a network configuration.

2. The low-gloss thermoplastic resin composition according to claim 1, further comprising (C) a heat resistant aromatic vinyl copolymer.

3. The low-gloss thermoplastic resin composition according to claim 1, wherein the (A) thermoplastic resin comprises (a1) an alkyl (meth)acrylate polymer forming a dispersed phase in a network configuration, and (a2) an aromatic vinyl-vinyl cyanide copolymer forming a continuous phase.

4. The low-gloss thermoplastic resin composition according to claim 1, wherein the (B) acrylic resin forming a second dispersed phase is an acrylic graft copolymer.

5. The low-gloss thermoplastic resin composition according to claim 1, wherein the second dispersed phase is in the form of particles.

6. The low-gloss thermoplastic resin composition according to claim 2, wherein the low-gloss thermoplastic resin composition comprises about 20 to about 50% by weight of the (A) thermoplastic resin having a dispersed phase in a network configuration, about 5 to about 40% by weight of the (B) acrylic resin, and about 10 to about 50% by weight of the (C) heat resistant aromatic vinyl copolymer.

7. The low-gloss thermoplastic resin composition according to claim 3, wherein the (A) thermoplastic resin comprises about 5 to about 35% by weight of the (a1) alkyl (meth)acrylate polymer and about 65 to about 95% by weight of the (a2) aromatic vinyl-vinyl cyanide copolymer.

8. The low-gloss thermoplastic resin composition according to claim 3, wherein the (a1) alkyl (meth)acrylate polymer comprises units derived from an alkyl (meth)acrylate compound, an unsaturated carboxylic acid, an anhydride thereof, or a combination thereof, and a compound having two or more hydroxyl groups.

9. The low-gloss thermoplastic resin composition according to claim 8, wherein the (a1) alkyl (meth)acrylate polymer comprises: about 60 to about 95% by weight of the alkyl (meth)acrylate compound; about 1 to about 20% by weight of the unsaturated carboxylic acid, anhydride thereof, or combination thereof; about 0 to about 20% by weight of an aromatic vinyl compound; about 0 to about 10% by weight of a vinyl cyanide compound; and about 0.1 to about 3 equivalents of the compound having two or more hydroxyl groups per equivalent of the unsaturated carboxylic acid, anhydride thereof, or combination thereof.

10. The low-gloss thermoplastic resin composition according to claim 8, wherein the compound having two or more hydroxyl groups is selected from the group consisting of $C_2$-$C_{10}$ alkanediols, polyalkylene glycols, polyols, and mixtures thereof.

11. The low-gloss thermoplastic resin composition according to claim 3, wherein the (a1) alkyl (meth)acrylate polymer comprises alkyl (meth)acrylate units and unsaturated carboxylic acid, an anhydride thereof, or a combination thereof units in the main chain thereof, and the carboxyl groups of the unsaturated carboxylic acid, anhydride thereof, or combination thereof units are connected to the hydroxyl groups of the compound having two or more hydroxyl groups by ester bonds to form a dispersed phase in a network configuration.

12. The low-gloss thermoplastic resin composition according to claim 3, wherein the (a1) alkyl (meth)acrylate polymer comprises units derived from an alkyl (meth)acrylate compound, an unsaturated compound having a hydroxyl group, and a compound having two or more carboxyl groups.

13. The low-gloss thermoplastic resin composition according to claim 3, wherein the (a1) alkyl (meth)acrylate polymer comprises units derived from an alkyl (meth)acrylate compound, a glycidyl (meth)acrylate compound, and a compound having two or more hydroxyl groups.

14. The low-gloss thermoplastic resin composition according to claim 3, wherein the (a2) aromatic vinyl-vinyl cyanide copolymer comprises about 60 to about 95% by weight of aromatic vinyl compound units, about 5 to about 40% by weight of vinyl cyanide compound units, and about 0 to about 10% by weight of alkyl (meth)acrylate compound units.

15. The low-gloss thermoplastic resin composition according to claim 3, wherein the (a2) aromatic vinyl-vinyl cyanide copolymer has a weight average molecular weight of about 150,000 to about 300,000 g/mol.

16. The low-gloss thermoplastic resin composition according to claim 1, wherein the (B) acrylic resin has a structure in which about 40 to about 90% by weight of (b2) an aromatic vinyl compound-vinyl cyanide compound copolymer is grafted onto about 10 to about 60% by weight of (b1) a (meth)acrylic rubber.

17. The low-gloss thermoplastic resin composition according to claim 16, wherein the (b2) aromatic vinyl compound-vinyl cyanide compound copolymer is a copolymer of about 60 to about 80% by weight of an aromatic vinyl compound and about 20 to about 40% by weight of a vinyl cyanide compound.

18. The low-gloss thermoplastic resin composition according to claim 16, wherein the (b1) (meth)acrylic rubber particles have an average particle diameter in the range of about 0.05 to about 1 μm.

19. The low-gloss thermoplastic resin composition according to claim 2, wherein the (C) heat resistant aromatic vinyl copolymer comprises aromatic vinyl compound units, vinyl cyanide compound units, and cross-linkable monomer units.

20. The low-gloss thermoplastic resin composition according to claim 19, wherein the (C) heat resistant aromatic vinyl copolymer comprises: 100 parts by weight of monofunctional vinyl compounds comprising about 60 to about 80% by weight of an aromatic vinyl compound and about 20 to about 40% by weight of a vinyl cyanide compound; and about 0.01 to about 0.05 parts by weight of a cross-linkable monomer.

21. The low-gloss thermoplastic resin composition according to claim 1, further comprising (D) an aromatic vinyl compound-vinyl cyanide compound copolymer, (E) a copolymer comprising a maleic anhydride compound, or a mixture thereof.

22. The low-gloss thermoplastic resin composition according to claim 21, wherein the resin composition comprises more than about 0 but not more than about 40% by weight of the (D) aromatic vinyl compound-vinyl cyanide compound copolymer, based on the total weight of the composition.

23. The low-gloss thermoplastic resin composition according to claim 21, wherein the resin composition comprises more than about 0 but not more than about 20% by weight of the (E) copolymer comprising a maleic anhydride compound, based on the total weight of the composition.

24. The low-gloss thermoplastic resin composition according to claim 21, wherein the (E) copolymer comprising a maleic anhydride compound comprises about 40 to about 60% by weight of maleic anhydride, N-substituted maleate, or a mixture thereof.

25. The low-gloss thermoplastic resin composition according to claim 1, further comprising one or more additives selected from the group consisting of antibacterial agents, heat stabilizers, antioxidants, release agents, light stabilizers, inorganic additives, surfactants, coupling agents, plasticizers, admixtures, stabilizers, lubricants, antistatic agents, toning agents, flame-proofing agents, weather stabilizers, colorants, UV absorbers, UV blocking agents, flame retardants, fillers, nucleating agents, adhesion aids, adhesives, and combinations thereof.

26. The low-gloss thermoplastic resin composition according to claim 1, wherein the composition has a gloss of about 30 G.U. or less as measured using a 75° gloss meter, a Vicat softening temperature of about 100 to about 150° C., a $\Delta E$ of about 2.8 or less as measured by UL 746C, and a notched Izod impact strength of about 8 kgf·cm/cm or more as measured at a thickness of 1/8" by ASTM D256.

\* \* \* \* \*

UNITED STATES PATENT AND TRADEMARK OFFICE
CERTIFICATE OF CORRECTION

PATENT NO. : 9,279,049 B2  Page 1 of 1
APPLICATION NO. : 14/627019
DATED : March 8, 2016
INVENTOR(S) : Jae Keun Hong et al.

It is certified that error appears in the above-identified patent and that said Letters Patent is hereby corrected as shown below:

Title Page, In the Bibliographic Data

Under "Foreign Patent Documents"

KR 10-2009-0049470 A   5/2009 is incorrectly listed as: KR 10-2000-0049470 A   5/2009

Signed and Sealed this
Twenty-eighth Day of June, 2016

Michelle K. Lee
*Director of the United States Patent and Trademark Office*